April 30, 1940.  S. J. MIKINA  2,198,784
TURBINE BLADE VIBRATION DAMPER
Filed Nov. 27, 1937
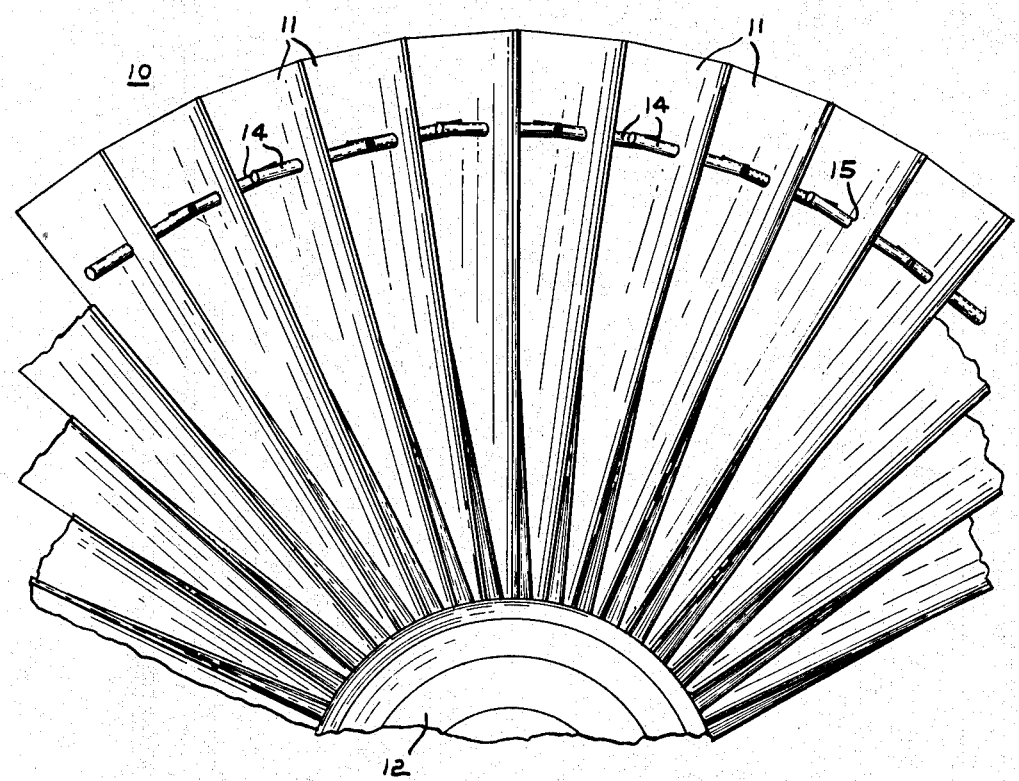
Fig. 1.
Fig. 2.
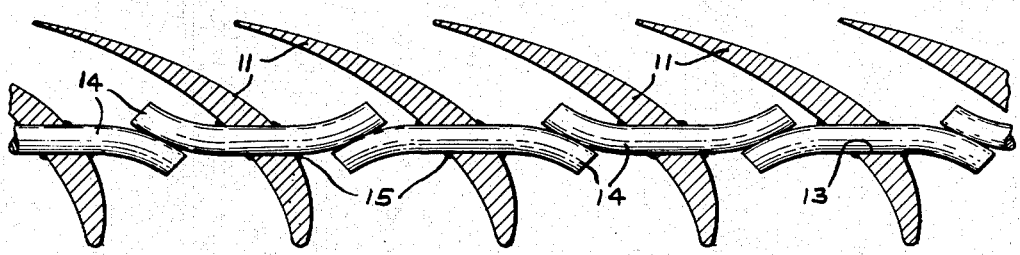
Fig. 3.
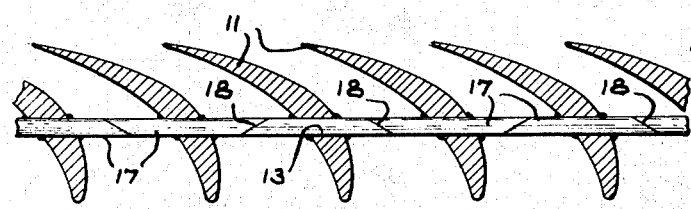
INVENTOR
STANLEY J. MIKINA.
BY
ATTORNEY Patented Apr. 30, 1940

2,198,784

UNITED STATES PATENT OFFICE 2,198,784

TURBINE BLADE VIBRATION DAMPER

Stanley J. Mikina, Wilkinsburg, Pa., assignor to Westinghouse Electric & Manufacturing Company, East Pittsburgh, Pa., a corporation of Pennsylvania Application November 27, 1937, Serial No. 176,905

6 Claims. (Cl. 253—77)

My invention relates to elastic fluid turbines and more particularly to the blading thereof.

Turbine blades, particularly the larger ones, are susceptible to vibration because there is no damping in them other than that due to stressing of the material. Blading can vibrate in a number of modes; and, as lower frequencies may be less than normal speed per second times the number of stationary blades or nozzles, a resonant condition may be encountered each time the turbine is stopped or started. Also, critical disturbing frequencies may occur at normal speed. Accordingly, it is an object of the present invention to provide blades with damping means.

A further object of my invention is to provide turbine blades with engaging spring members to exert a damping effect.

A further object of my invention is to provide damping means for blades and comprising laterally-engaging spring elements, the amount of the frictional damping effect being varied by choice of elements of suitable section or by the amount of spring bending.

A further object is to provide turbine blades with vibration damping means located near the free ends of the blades so as to be where the maximum motion may be expected, particularly at the lower modes.

A further object of my invention is to provide damping means for turbine blades comprising laterally engaging spring members constructed so as to be substantially independent of centrifugal force so far as damping is concerned, this result being particularly true of the arrangement where the ends of the spring members engage so that, with blade deflection, the associated spring members are deflected laterally of the plane of rotation.

With the conventional rigid lashing permanently connecting the blades of a segment to each other, trouble has been encountered frequently due to radial expansion and contraction of the blading, thereby producing an alternate stretching and crushing action in the lashing. It is, therefore, a further object of my invention to provide a lashing or vibration damping means which will avoid the above-mentioned faults of rigid lashing.

Another object of my invention is to provide a vibration damping means wherein vibrational energy of the blades is at least partially dissipated by frictional transformation into heat.

These and other objects are effected by my invention as will be apparent from the following description and claims taken in connection with the accompanying drawing forming a part of this application, in which:

Fig. 1 is a side elevational view of a group of reaction blades having my invention applied thereto:

Fig. 2 is a sectional development taken along the line of the lashing; and,

Fig. 3 is a view similar to Figure 2 showing a modified form of my invention.

In the drawing, the numeral 10, in its entirety, indicates a group of reaction blades 11 mounted on a rotor 12 in a manner well known in the art. Each blade 11 is provided near its outer or free end with a perforation 13 in which is mounted a piece of spring wire 14, or bar spring, as clearly shown in Fig. 2, the wires 14 being arched or bent and being of such length that they overlap and frictionally engage.

Each wire or bar 14 is permanently secured to its blade, preferably by the use of silver solder 15. These wires being made of spring material and engaging one another frictionally, blade vibration is damped due to transformation of vibrational energy, through friction, into heat. The frictional forces, developed with the spring wires, can be varied by the proper choice of wire size and amount of spring action and will be independent of any centrifugal force acting on the blades and the wires, it being apparent that, with increasing amplitudes of blade vibration, increasing lateral deflection of the wires is called for, that is, an increasing frictional force is encountered. By proper selection and construction, the amount of damping produced in this manner can be made large enough to permit of dispensing with the conventional lashing wire.

While I have shown my invention as applying only to moving blades of the reaction type, it will be obvious to those skilled in the art that my invention, not only may be applied to stationary blades, but may be used with blading or types other than the reaction.

A further and important advantage of my invention resides in the ease of assembly of the blades, the damping wires 14 being assembled and permanently secured to their respective blades prior to assembly of the blades on the rotor or stator. In assembling, each blade, after being packed in place, can be sprung aside until the next blade is properly positioned, after which the former blade will be released to spring back into place.

In Fig. 3, there is shown a modified construction of my invention wherein the blades 11 are provided with spring pieces 17 secured to the blades as already described, but wherein instead of bending the ends of the pieces to provide overlapping contacting surfaces, the ends are bevelled to provide engaging faces 18 to serve the same purpose. The necessary spring force pressing the engaging ends together may be secured either from deflection of the spring pieces during assembly, or deflection of the associated blades.

The term "tangential" vibration or deflection, as used herein, refers to vibration or deflection in a plane which is tangent to a surface of revolution with respect to the axis of rotation of the blade-carrying member and within the plane of rotation of the blades.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a turbine, a plurality of blades and means for damping vibration thereof comprising members autogenously connected to the blades, and having overlapping frictionally engaging surfaces.

2. In a turbine, a row of blades, each blade having a hole therethrough near the free end thereof, and blade vibration damping means comprising pieces of spring wire, each rigidly secured in a blade hole, said pieces being curved and arranged so that convex sides of adjacent end portions are in frictional lateral engagement.

3. In a turbine, a row of blades, each blade having a hole therethrough near the free end thereof, and blade vibration damping means comprising pieces of spring metal, each rigidly secured in a blade hole and extending in opposite directions toward the pieces in the adjacent blades and the adjacent ends of pieces of adjacent blades having frictional lateral engagement.

4. In a turbine, a row of blades, each blade having a hole therethrough near the free end thereof, and blade vibration damping means comprising pieces of spring metal, each rigidly secured in a blade hole and extending in opposite directions toward the pieces in the adjacent blades and the adjacent ends of pieces of adjacent blades frictionally engaging laterally and obliquely with respect to the general direction of extent thereof so that blade deflection in the plane of rotation is opposed by the spring and frictional action of said pieces.

5. In a turbine, a row of blades, and means for damping vibration thereof comprising spring members each associated with a blade and adapted to resiliently and frictionally engage the members of the adjacent blades, the contacting surfaces of the coacting spring members being curved.

6. In a turbine, a row of blades, and means for damping vibration thereof comprising spring members each associated with a blade and adapted to resiliently and frictionally engage the members of the adjacent blades, the spring members having the ends thereof bevelled to provide engaging frictional surfaces.

STANLEY J. MIKINA.